(12) United States Patent
Miyazaki et al.

(10) Patent No.: US 10,116,005 B2
(45) Date of Patent: Oct. 30, 2018

(54) ENERGY STORAGE DEVICE, WINDING APPARATUS, AND WINDING METHOD

(71) Applicant: GS Yuasa International Ltd., Kyoto-shi (JP)

(72) Inventors: Akihiko Miyazaki, Kyoto (JP); Sumio Mori, Kyoto (JP); Tomonori Kako, Kyoto (JP)

(73) Assignee: GS YUASA INTERNATIONAL, LTD., Kyoto-Shi, Kyoto (JP)

( * ) Notice: Subject to any disclaimer, the term of this patent is extended or adjusted under 35 U.S.C. 154(b) by 918 days.

(21) Appl. No.: 13/793,640

(22) Filed: Mar. 11, 2013

(65) Prior Publication Data
US 2013/0244072 A1    Sep. 19, 2013

(30) Foreign Application Priority Data
Mar. 14, 2012   (JP) ................. 2012-057920

(51) Int. Cl.
*H01M 10/0587* (2010.01)
*H01M 10/04* (2006.01)
(Continued)

(52) U.S. Cl.
CPC ........ *H01M 10/0587* (2013.01); *H01G 11/52* (2013.01); *H01M 2/1686* (2013.01); *H01M 10/0409* (2013.01); *H01M 10/049* (2013.01); *H01M 10/0525* (2013.01); *H01M 2/263* (2013.01); *H01M 6/10* (2013.01); *H01M 10/0431* (2013.01); *H01M 10/125* (2013.01); *H01M 10/286* (2013.01); *H01M 2006/106* (2013.01); *Y02E 60/13* (2013.01);
(Continued)

(58) Field of Classification Search
None
See application file for complete search history.

(56) References Cited

U.S. PATENT DOCUMENTS 8,956,748 B2    2/2015  Sasaki
2006/0073380 A1*  4/2006  Kim .................... H01M 10/052
                                                              429/129
(Continued)

FOREIGN PATENT DOCUMENTS

JP    2000-173642 A    6/2000
JP    2006-040545 A    2/2006
(Continued)

OTHER PUBLICATIONS

Machine translation of Murayama et al. JP 2009289661 A.*
Machine translation of Fukumoto et al. WO 2011108119 A1.*

*Primary Examiner* — Milton I Cano
*Assistant Examiner* — Haixia Zhang
(74) *Attorney, Agent, or Firm* — McGinn IP Law Group, PLLC

(57) ABSTRACT

An energy storage device includes: a core; and a wound body including, layered and wound around the core: a positive electrode, a negative electrode, and two separators, one of which is interposed between the positive electrode and the negative electrode and each having a first surface and a second surface. The first surface has thermal bonding properties superior to thermal bonding properties of the second surface, and at least one of the two separators is bonded to the core via the first surface thereof.

22 Claims, 8 Drawing Sheets

(51) Int. Cl.
*H01M 10/0525* (2010.01)
*H01M 2/16* (2006.01)
*H01G 11/52* (2013.01)
*H01M 6/10* (2006.01)
*H01M 10/12* (2006.01)
*H01M 2/26* (2006.01)
*H01M 10/28* (2006.01)

(52) U.S. Cl.
CPC .... *Y10T 29/49108* (2015.01); *Y10T 29/49114* (2015.01); *Y10T 29/52* (2015.01)

(56) References Cited

U.S. PATENT DOCUMENTS

2008/0206646 A1* 8/2008 Kikuchi ............... H01M 2/162
429/246

2009/0325058 A1* 12/2009 Katayama ............... H01G 9/02
429/142

2013/0071712 A1  3/2013 Sasaki

FOREIGN PATENT DOCUMENTS

| | | | |
|---|---|---|---|
| JP | 2006-302800 A | 11/2006 | |
| JP | 2009-224038 A | 10/2009 | |
| JP | 2009-224235 A | 10/2009 | |
| JP | 2009-283273 A | 12/2009 | |
| JP | 2009-289661 A | 12/2009 | |
| JP | 2009289661 A * | 12/2009 | |
| JP | 2011-076862 A | 4/2011 | |
| JP | 2011-175749 A | 9/2011 | |
| JP | WO 2011108119 A1 * | 9/2011 | ......... H01M 2/1646 |
| JP | 2012-022813 A | 2/2012 | |
| WO | WO 2011/148866 A1 | 12/2011 | |
| WO | WO 2013/108372 A1 | 7/2013 | |

\* cited by examiner

ENERGY STORAGE DEVICE, WINDING APPARATUS, AND WINDING METHOD

CROSS REFERENCE TO RELATED APPLICATION

The present application is based on and claims priority of Japanese Patent Application No. 2012-57920 filed on Mar. 14, 2012. The entire disclosure of the above-identified application, including the specification, drawings and claims is incorporated herein by reference in its entirety.

FIELD

The present invention relates to a wound electrode assembly in which a positive electrode sheet and a negative electrode sheet are wound with two separators alternately interposed therebetween, and to a winding apparatus and winding method for manufacturing a wound electrode assembly of an energy storage device.

BACKGROUND

Conventional structures of energy storage devices including batteries such as lithium-ion batteries include wound electrode assemblies formed by alternately layering a positive electrode, a negative electrode, and two separators, then winding these sheets layered in this manner. In energy storage devices having such wound electrode assemblies, the two separators are fixed to a core at winding starting points at the center of the wound electrode assembly before the sheets are wound. The two separators are fixed, for example, by thermal bonding or with tape. Here, thermal bonding is preferred as a fixing method in terms of durability within the internal environment of the battery and impact battery performance. For example, Patent Literature 1 (PTL 1) discloses a wound battery in which an end of a separator is thermally bonded to an axis (core).

CITATION LIST

Patent Literature

[PTL 1] Japanese Unexamined Patent Application Publication No. 2009-224038

SUMMARY

The present invention aims to provide an energy storage device that employs the use of a separator provided with a layer having poor thermal bonding properties such as a heat resistant coated layer and that is capable of inhibiting a decrease in performance.

In order to achieve the above goal, an energy storage device according to an aspect of the present invention includes: a core; and a wound body including, layered and wound around the core: a positive electrode, a negative electrode, and two separators, one of which is interposed between the positive electrode and the negative electrode and each having a first surface and a second surface, the first surface having thermal bonding properties superior to thermal bonding properties of the second surface; wherein at least one of the two separators is bonded to the core via the first surface thereof.

With this, in the wound body, at least one of the two separators, each of which has mutually different surfaces, is bonded to the core via the first surface thereof, which has thermal bonding properties superior to those of the second surface. As a result, the positive electrode, the negative electrode, and the two separators can easily be wound while at least one of the separators is subjected to tension at the wound body winding start point. Consequently, a gap (distance) can be prevented from forming between the positive electrode and the negative electrode of the wound electrode assembly at the time of winding, thereby inhibiting the manufacturing of an energy storage device having degraded performance.

Moreover, at least one of the two separators may be bonded to the core via the first surface thereof, and the two separators may be bonded together via the first surfaces thereof.

With this, the first surface of at least one of the two separators is bonded to the core, and furthermore, the first surfaces of the two separators, which have thermal bonding properties superior to those of the second surfaces, are bonded together. In other words, one separator is directly bonded to the core and the other separator is indirectly bonded to the core the one separator. With this, the two separators can be securely bonded to the core.

Moreover, the two separators may be bonded to the core via the first surfaces thereof.

With this, the two separators are bonded to the core via the first surfaces thereof, which have bonding properties superior to those of the second surfaces. Consequently, the two separators can be securely bonded to the core.

Moreover, the core may have a main body and a branch portion branching off from the main body, and at least one of the two separators may be bonded to the branch portion via the first surface thereof.

Moreover, the two separators may sandwich the branch portion and may be bonded to the branch portion via the first surfaces thereof.

Moreover, one of the two separators may be bonded to the branch portion via the first surface thereof, and the other of the two separators may be bonded to the main body via the first surface thereof.

Moreover, the core may include a material having thermal bonding properties superior to the thermal bonding properties of the first surface.

With this, the thermal bonding properties of the core are superior to the first surfaces of the two separators, which have thermal bonding properties superior to those of the second surfaces. This allows the core and the first surface of a separator to be bonded and the insulation sheet to be bonded at a temperature lower than a temperature required to bond the separators together. This makes it possible to easily bond the core, and the separator.

Moreover, the two separators may each have a first layer on which the first surface is formed and a second layer on which the second surface is formed, the second surface having thermal bonding properties inferior to the thermal bonding properties of the first surface, and the second layer may contain heat resistant particles.

With this, the energy storage device includes a separator containing heat resistant particles for maintaining insulation between the positive electrode and the negative electrode in the electrode assembly when the energy storage device is placed in a high temperature environment. When the separator contains heat resistant particles, the layer in which the heat resistant particles are contained generally has extremely poor thermal bonding properties. Consequently, the two separators can be securely bonded to the core even when the separators have a surface having poor thermal boding properties.

Moreover, the two separators may sandwich the positive electrode, and the second surfaces of the two separators may be in contact with the positive electrode.

With this, oxidation of the separator in the electrode assembly of the energy storage device from sandwiching the positive electrode having a high potential can be prevented since the surfaces sandwiching the positive electrode contain heat resistant particles.

Moreover, the two separators may sandwich a more thermally conductive one of the positive electrode and the negative electrode, and the first surfaces of the two separators may be in contact with the more thermally conductive one of the positive electrode and the negative electrode.

With this, placing the energy storage device in a high temperature environment causes the more thermally conductive one of the positive electrode and the negative electrode in the electrode assembly to rise in temperature more quickly. As such, the first surfaces of the two separators, which have thermal bonding properties superior to those of the second surfaces, increase in temperature and melt. This closes up a portion of the holes in the separator. As a result, ionic conduction allowed by the separator decreases, and discharge of the energy storage device while placed in a high temperature environment can be prevented.

Moreover, the present invention can be realized as a winding apparatus for manufacturing the energy storage device.

In other words, the winding apparatus according to an aspect of the present invention includes: a bonding unit configured to perform the boding; and a winding unit configured to wind, around a core, a layered body including a positive electrode, a negative electrode, and a separator interposed between the positive electrode and the negative electrode and bonded to the core by the bonding unit.

It is to be noted that the present invention can not only be realized as this sort of winding apparatus, but also as a winding method performed by various structural elements of this sort of winding apparatus.

BRIEF DESCRIPTION OF DRAWINGS

These and other objects, advantages and features of the invention will become apparent from the following description thereof taken in conjunction with the accompanying drawings that illustrate a specific embodiment of the present invention.

DESCRIPTION OF EMBODIMENTS

A separator can be designed for maintaining insulation between the positive and negative electrodes even when the battery is placed in a high temperature environment by coating one side of the separator with a heat-resistant layer such as a heat-resistant filler (such a separator is hereinafter also referred to as a heat-resistant treated separator). When used in a wound electrode assembly, bonding of the heat-resistant layer on this kind of heat-resistant treated separator to the wound body at the winding start point is difficult since the heat-resistant layer is resistant to thermal bonding. For this reason, the above-described sheets (the positive electrode, the negative electrode, and the two separators) are difficult to wind under tension when manufacturing the wound electrode assembly. The positive electrode, the negative electrode, and the two separators can easily become slack when wound if the separator is not securely bonded at the center of the wound electrode assembly. Consequently, a gap (distance) can easily form between the positive electrode and the negative electrode of the wound electrode assembly, contributing to a decrease in performance of the energy storage device.

Hereinafter, embodiments of the present invention are described with reference to the Drawings. Each of the exemplary embodiments described below shows a general or specific example. The shapes, materials, structural elements, the arrangement and connection of the structural elements etc. shown in the following exemplary embodiments are mere examples, and therefore do not limit the scope of the appended Claims and their equivalents. The present invention is limited by the Claims. Therefore, among the structural elements in the following exemplary embodiments, structural elements not recited in any one of the independent claims are not a crucial requirement for achieving the aim of the present invention, but are described as further preferable embodiments.

First Embodiment

Figure 1:
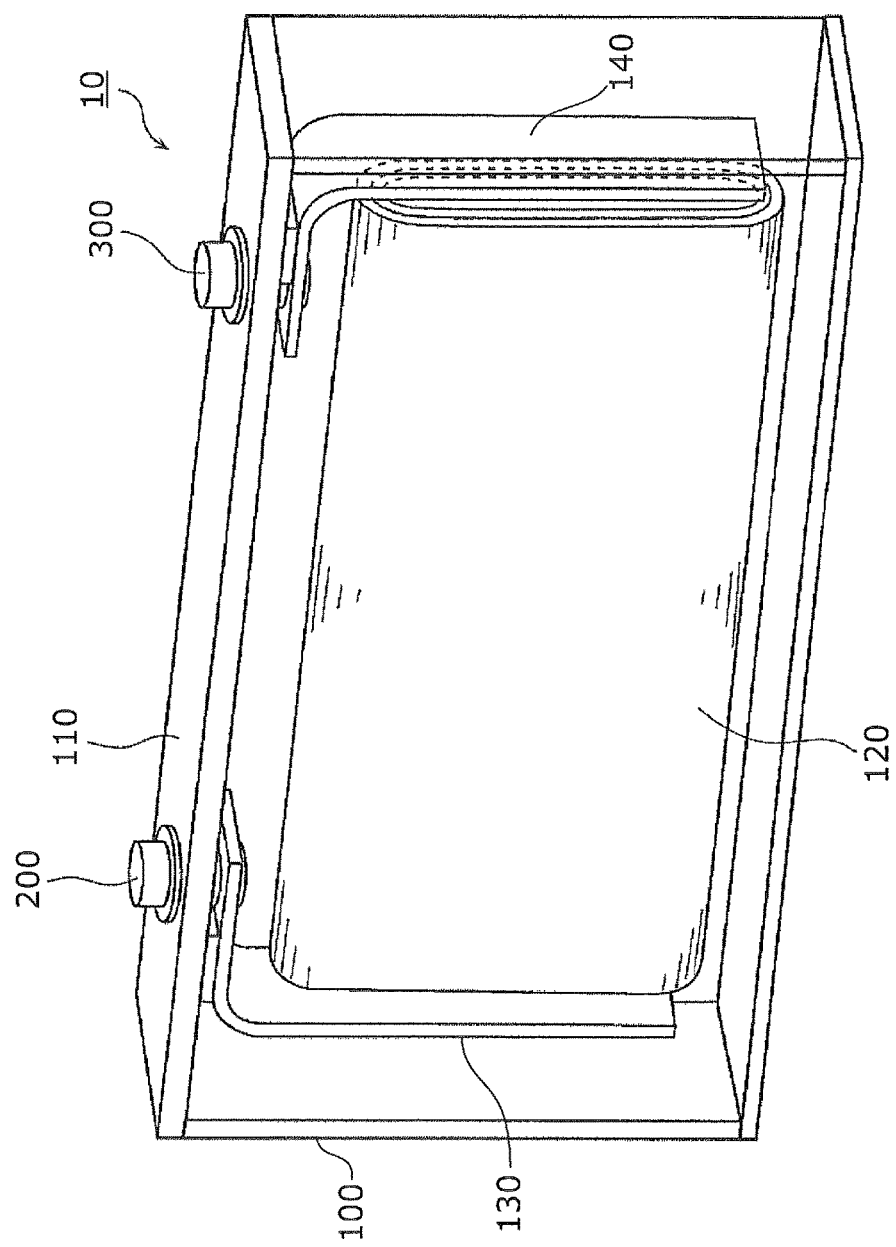
FIG. 1 is a perspective view where one of the walls of the container of the energy storage device according to the first embodiment of the present invention is omitted to schematically show the internal structure of a battery.

FIG. 1 is a perspective view where one of the walls of the container of the energy storage device is omitted to schematically show the internal structure of the battery.

An energy storage device 10 is a secondary battery capable of discharging and charging electricity, and more specifically is a non-aqueous electrolyte battery such as a lithium ion secondary battery.

As FIG. 1 shows, the energy storage device 10 includes a container 100, a positive electrode terminal 200, and a negative electrode terminal 300. The container 100 includes a cover 110 functioning as the top wall of the container 100. Moreover, an electrode assembly 120, a positive electrode current collector 130, and a negative electrode current collector 140 are included inside the container 100.

It is to be noted that even though it is not shown in the Drawings, the container 100 of the energy storage device 10 contains liquid such as an electrolyte. Moreover, the energy storage device 10 is not limited to a non-aqueous electrolyte battery. The energy storage device 10 may be a secondary battery other than a non-aqueous electrolyte battery, such as a capacitor.

The container 100 is configured of a rectangular tubular metal case having a bottom, and the cover 110 that is metallic and covers the opening of the case. Moreover, the inside of container 100 is sealed after insertion of the electrode assembly 120 and such by, for example, welding the cover 110 to the case.

The electrode assembly 120, a component that is capable of storing electricity, includes the positive electrode, the negative electrode, and the separator. Specifically, the electrode assembly 120 is formed by winding into an oblong shape a layered body of the negative electrode, the positive electrode, and the separator interposed therebetween. It is to be noted that in FIG. 1, the electrode assembly 120 is depicted as being oblong in shape, but the electrode assembly 120 may be circular or elliptical in shape. Details regarding the structure of the electrode assembly 120 will be disclosed later.

The positive electrode terminal 200 is an electrode terminal that is electrically connected to the positive electrode in the electrode assembly 120, and the negative electrode terminal 300 is an electrode terminal that is electrically connected to the negative electrode in the electrode assembly 120. In other words, the positive electrode terminal 200 and the negative electrode terminal 300 are metallic electrode terminals for leading electricity stored in the electrode assembly 120 out of the energy storage device 10 and guiding electricity into the energy storage device 10 to be stored in the electrode assembly 120. Moreover, the positive electrode terminal 200 and the negative electrode terminal 300 are attached to the cover 110 located above the electrode assembly 120.

The positive electrode current collector 130 is a rigid component having conductive properties that is electrically connected to the positive electrode terminal 200 and the positive electrode in the electrode assembly 120, and positioned between the positive electrode in the electrode assembly 120 and a side wall of the container 100. It is to be noted that the positive electrode current collector 130 and the positive electrode in the electrode assembly 120 alike are made of aluminum.

The negative electrode current collector 140 is a rigid component having conductive properties that is electrically connected to the negative electrode terminal 300 and the negative electrode in the electrode assembly 120, and positioned between the negative electrode in the electrode assembly 120 and a side wall of the container 100. It is to be noted that the negative electrode current collector 140 and the negative electrode in the electrode assembly 120 are made of copper.

Figure 2:
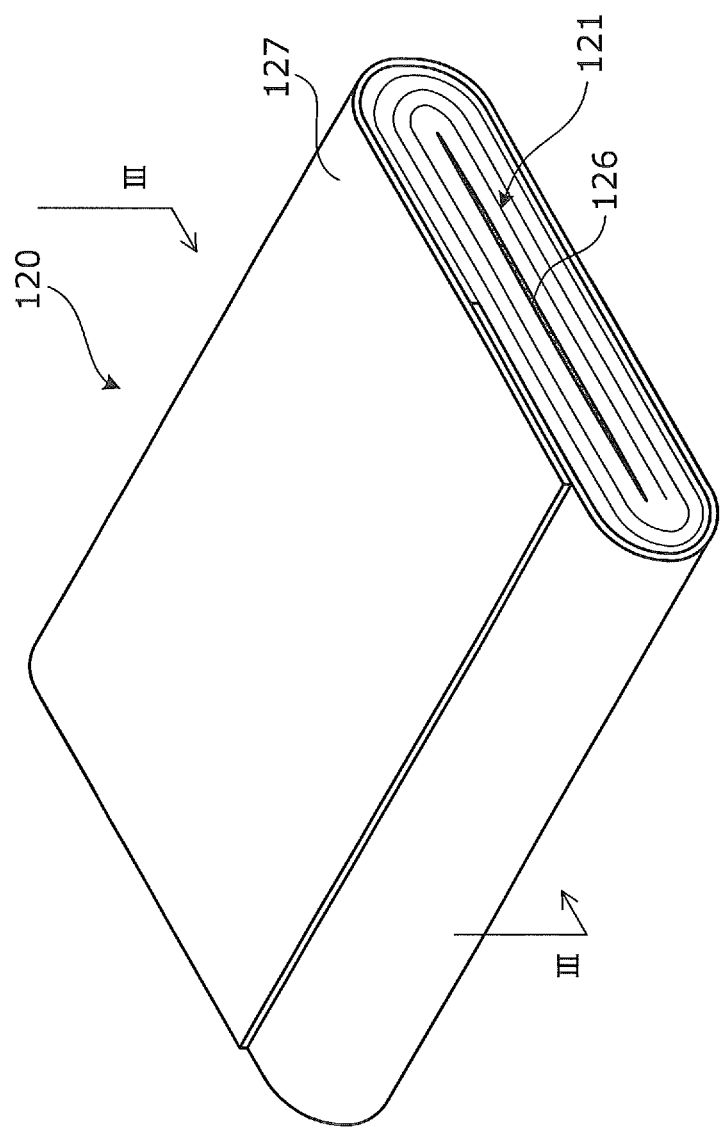
FIG. 2 is a perspective view schematically showing the external appearance of the electrode assembly.
Figure 3:
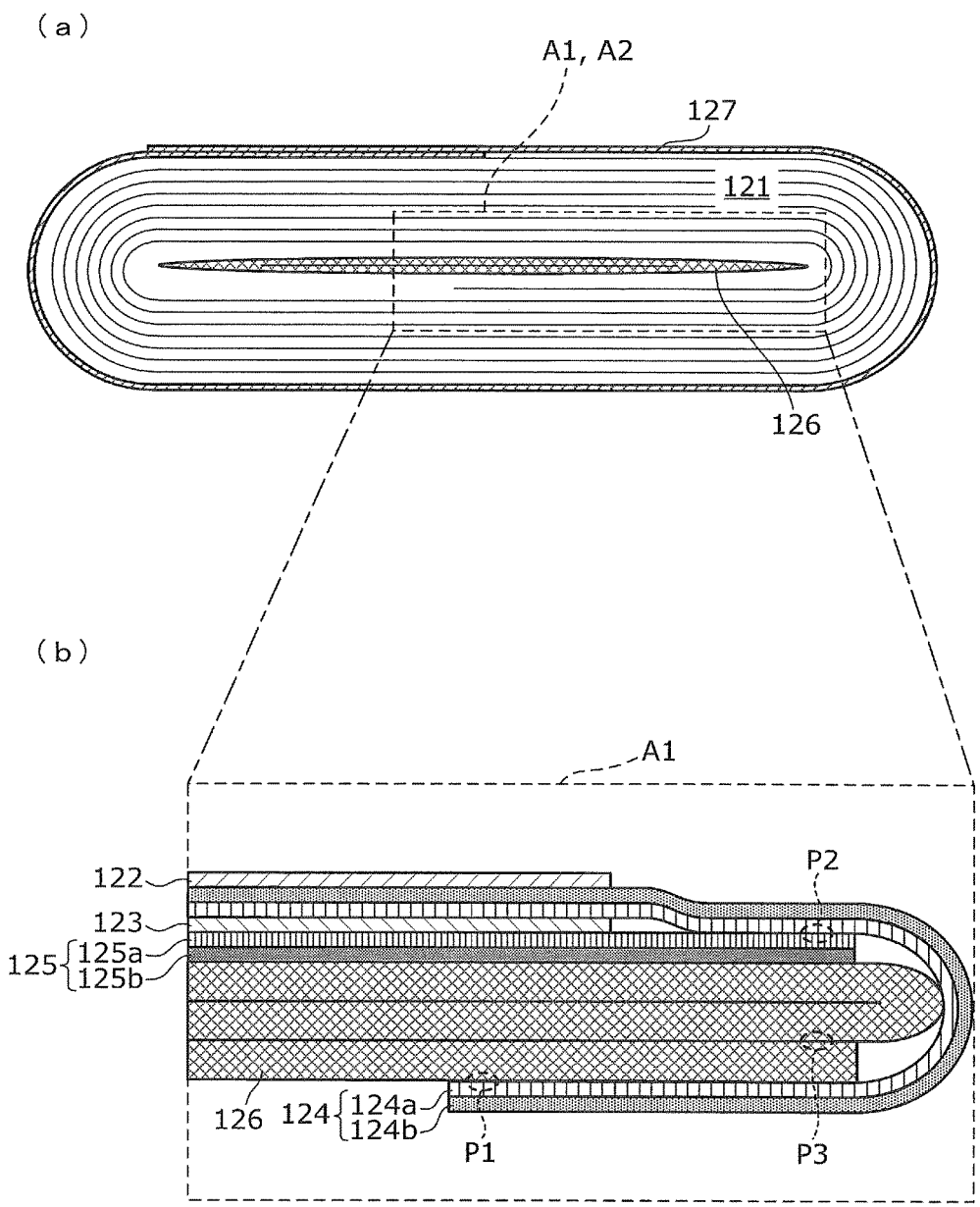
FIG. 3 ($a$) is a cross section of the electrode assembly along III-III shown in FIG. 2, and FIG. 3 ($b$) is an expanded view of the portion A1 shown in FIG. 3 ($a$).

FIG. 2 is a perspective view schematically showing the external appearance of the electrode assembly. FIG. 3 (a) is a cross section of the electrode assembly along III-III shown in FIG. 2. FIG. 3 (b) is an expanded view of the portion A1 shown in FIG. 3 (a). It is to be noted that FIG. 3 (b) is an extraction of only the portion of the wound body at the start of the winding around the core. In actuality, the positive electrode, the negative electrode, and the two separators are wound a number of times to create plurality of layers in an outward direction.

The electrode assembly 120, which is a wound electrode assembly, is configured of a core 126, a wound body 121, and an insulation sheet 127, as FIG. 2, FIG. 3 (a), and FIG. 3 (b) show.

The core 126 is a polypropylene or polyethylene long belt-shaped sheet that is folded twice and bonded together at a third point P3 at the end of the final fold portion, and is located at the center of the wound body 121.

The wound body 121 is formed by winding, around the core 126, a layered body including the positive electrode 122, the negative electrode 123, and two separators 124 and 125 one of which is interposed between the positive electrode 122 and the negative electrode 123 and each having two surfaces having different thermal bonding properties, so that the layers become stacked and a cross section of the wound body 121 becomes oblong in shape. More specifically, the wound body 121 is formed by bonding a layered body of the positive electrode 122, the first separator 124, the negative electrode 123, and the second separator 125 layered in this order to the core 126 via the first separator 124 and the second separator 125, and winding the layered body of these four layers around the core 126 (winding axis). In other words, the two separators 124 and 125 sandwich the positive electrode 122, and the second layer 124b of the separator 124 and the second layer 125b of the separator 125 on which the respective second surfaces are formed (to be described later) are in contact with the positive electrode 122. Moreover, the two separators 124 and 125 sandwich the negative electrode 123, and the first layer 124a of the separator 124 and the first layer 125a of the separator 125 on which the respective first surfaces are formed (to be described later) are in contact with the negative electrode 123. The wound body 121 is designed such that after winding, the positive electrode 122 and the negative electrode 123 are not included in the outermost layer.

The wound body 121 is formed by winding, around the core 126, a layered body in which the positive electrode 122 and the negative electrode 123 coated with active materials and the two separators 124 and 125 each having two surfaces having different thermal bonding properties are alternately interposed. In other words, the wound body 121 is formed of a layered body including the positive electrode 122, the first separator 124, the negative electrode 123, and the second separator 125 layered in this order and wound so that a cross section thereof is oblong in shape.

The positive electrode 122 is a long, belt-shaped positive electrode current collector sheet made of aluminum that includes a positive electrode active material layer formed on a surface thereof. It is to be noted that the positive electrode 122 used in the energy storage device 10 according to the present invention is not particularly different from conventional positive electrodes, and commonly used positive electrodes may be used as the positive electrode 122.

A polyanion compound such as $LiMPO_4$, $LiMSiO_4$, or $LiMBO_3$ (where M is one or more transition metal element selected from: Fe, Ni, Mn, Co and the like), a spinel compound such as lithium titanate or lithium maganate, or a lithium transition metal oxide such as $LiMO_2$ (where M is one or more transition metal element selected from: Fe, Ni, Mn, Co and the like), for example, can be used as the positive electrode active material.

The negative electrode 123 is a long, belt-shaped negative electrode current collector sheet made of copper that includes a negative electrode active material layer formed on a surface thereof. It is to be noted that the negative electrode 123 used in the energy storage device 10 according to the present invention is not particularly different from conventional negative electrodes, and commonly used negative electrodes may be used as the negative electrode 123.

For example, any appropriate, well-known material that is a negative electrode active material capable of adsorbing and desorbing lithium ions can be used as the negative electrode active material. For example, in addition to a lithium metal or a lithium alloy (a lithium metal containing alloy such as lithium-aluminum, lithium-lead, lithium-tin, lithium-aluminum-tin, lithium-gallium, and wood's alloy), an alloy capable of adsorbing/desorbing lithium, a carbon material (for example, graphite, a non-graphitizing carbon, a graphitizable carbon, a low temperature carbon, or amorphous carbon), a metal oxide, a lithium metal oxide (for example, $Li_4Ti_5O_{12}$), or a polyphosphate compound may be used.

Moreover, the first separator 124 and the second separator 125 are long, belt-shaped separators interposed between the positive electrode 122 and the negative electrode 123. The first separator 124 includes a first layer 124a and a second layer 124b, and the second separator 135 includes a first layer 125a and a second layer 125b.

The first layers 124a and 125a are microporous sheets including a thermo plastic resin that form the base material layers of the first separator 124 and the second separator 125, respectively.

Specifically, resin porous membranes having polymer, natural, hydrocarbon, glass, or ceramic fibers that are woven or non-woven are used as the first layers 124a and 125a. Moreover, the resin porous membranes preferably have woven or non-woven polymer fibers. More particularly, the resin porous membranes preferably have polymer fibers or fleece, or are a similar textile or fleece. The polymer fiber is preferably a non-conductive polymer fiber selected from polycrylonitrile (PAN), polyimide (PA), a polyester such as polyethylene telephthalate (PET), and/or a polyolefin (PO) such as polypropylene (PP), polyethelene (PE), or a similar polyolefin composite. Moreover, the resin porous membranes may be, for example, polyolefin microporous membranes, non-woven fabric, or paper, and are preferably polyolefin microporous membranes. Polyethylene, polypropylene, or a composite thereof can be used for the porous polyolefin layer. It is to be noted that, taking into consideration its impact on battery characteristics, the first layers 124a and 125a preferably have a thickness of approximately 5 to 30 μm.

The second layers 124b and 125b are positioned above and have different material properties than the first layers 124a and 125a. According to this embodiment, the second layers 124b and 125b are heat resistant layers coated on the first layers 124a and 125a, respectively. Here, the heat resistant coated layer is, for example, a layer including inorganic particles or a heat resistant resin (heat resistant particles).

Inorganic particles are, specifically, particles of an inorganic material of more than one of a single component selected from the following, a compound of more than one of the following, or a composite compound of more than one of the following: an oxide such as an iron oxide, $SiO_2$, $Al_2O_3$, $TiO_2$, $BaTiO_2$, $ZrO$, or an alumina-silica complex oxide or the like, a fine particle nitride such as aluminum nitride or silicon nitride or the like, insoluble fine ionic crystal particles of calcium fluoride, barium fluoride, or barium sulfate or the like, covalent fine crystal particles of silicon or diamond or the like, fine ceramic particles of talc or montmorillonite or the like, synthetic material of or material derived from mineral resources such as boehmite, zeolite, appetite, kaolin, mullite, spinel, olivine, sericite, bentonite, or mica or the like. Moreover, the above inorganic material may be particles made to have electrical insulation properties by processing the surfaces of electrically conductive fine particles such as fine oxide particles of $SnO_2$ or tin-indium oxide (ITO) or the like, or fine carbonaceous chondrite particles of carbon black or graphite or the like, with a material having electrical insulation properties (for example, materials made from the previously described electrical insulating inorganic particles).

The second layers 124b and 125b have thermal boding properties that are inferior to those of the first layers 124a and 125a. In other words, the first separator 124 has a first layer 124a on which a first surface having thermal bonding properties superior to those of the second surface is formed, and a second layer 124b on which a second surface having thermal boding properties inferior to those of the first surface is formed. Likewise, the second separator 125 has a first layer 125a on which a first surface having thermal bonding properties superior to those of the second surface is formed, and a second layer 125b on which a second surface having thermal boding properties inferior to those of the first surface is formed.

At least one of the two separators 124 and 125 (the first separator 124 in this embodiment) is bonded to the core 126 via the first layer 124a on which the first surface having the superior thermal bonding properties is formed. Moreover, the two separators 124 and 125 are layered so that the first layers 124a and 125a on which the first surfaces are formed oppose each other. Moreover, the opposing first layer 124a and first layer 125a are bonded together at a second point P2. The first surface (the first layer 124a) of the first separator 124 of the two separators 124 and 125 is bonded to the core 126 at a first point P1.

The insulation sheet 127 is bonded at one end to at least one of the two separators 124 and 125, wound around the outer layer of the wound body 121 once, then bonded to itself at an overlapping area of the other end. Since the insulation sheet 127 is bonded to itself after being pulled taut and wound one time around the outer layer of the wound body 121, gaps are kept from forming between each sheet of the wound body 121 (the positive electrode 122, the negative electrode 123, the separator 124, and the separator 125).

Figure 4:
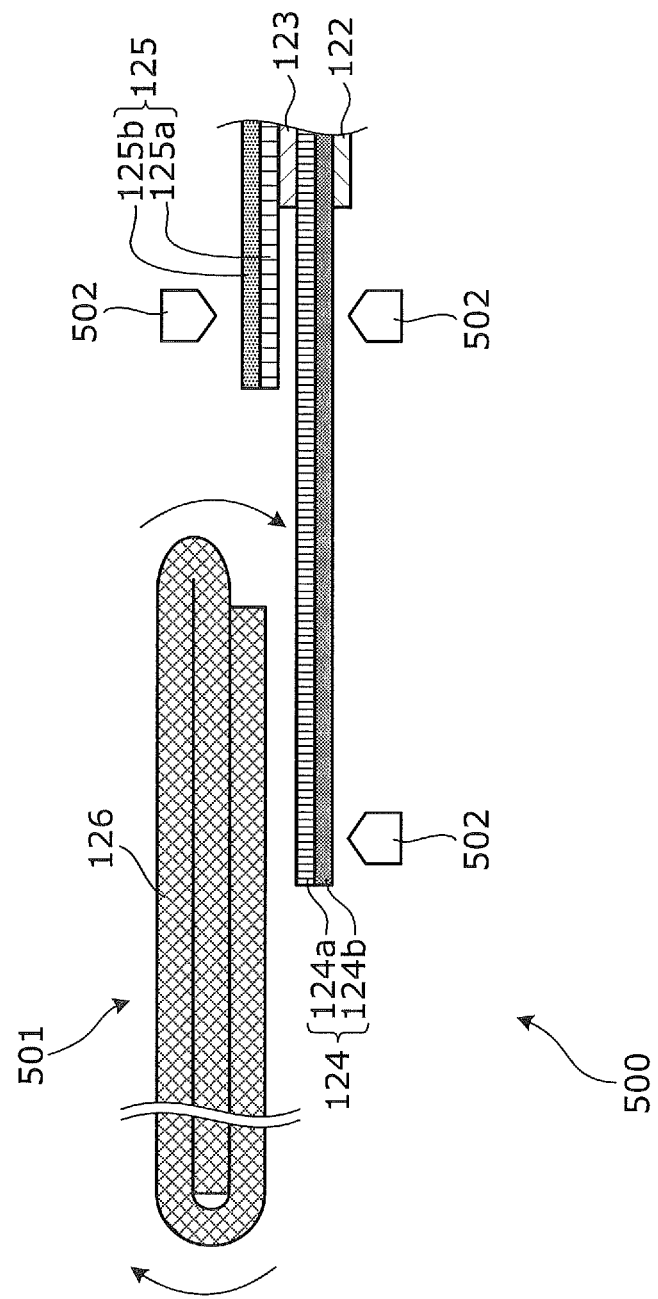
FIG. 4 shows an outline of a winding apparatus.

FIG. 4 shows an outline of a winding apparatus 500. The wound body 121 is manufactured using a winding apparatus 500. The winding apparatus 500 includes a winding unit 501 and a bonding unit 502. The bonding unit 502 bonds the first separator 124 and the core 126 at the first point P1 shown in FIG. 3 (b), and bonds the two separators 124 and 125 together at the second point P2 (bonding step). The winding unit 501, as FIG. 4 shows, winds the positive electrode 122 and the negative electrode 123 around the core 126 while the separators 124 and 125 directly and indirectly bonded to the core 126 by the bonding unit 502 are sandwiched alternately between the positive electrode 122 and the negative electrode 123 (winding step).

With the energy storage device 10 according to the first embodiment, since the first separator 124, which is the at least one of the two separators 124 and 125 of the wound body 121 having mutually different thermal bonding properties, is connected to the core 126 via the first layer 124a on which the first surface having the superior thermal bonding properties is formed, the positive electrode 122, the negative electrode 123, and the two separators 124 and 125 can easily be wound while tension is applied to the first separator 124 at the winding starting point of the wound body 121. For this reason, a gap (distance) can be prevented from forming between the positive electrode 122 and the negative electrode 123 of the electrode assembly 120 functioning as the wound electrode assembly, thereby inhibiting the manufacturing of the energy storage device 10 having degraded performance. Moreover, since the tension applied to the positive electrode 122, the negative electrode 123, and the two separators 124 and 125 is maintained, change in their relative positions and shrinkage of the separators 124 and 125 can be inhibited. As a result, the positive electrode 122 and the negative electrode 123 can be prevented from directly coming in contact with each other, aiding in preventing the energy storage device 10 from degrading in performance.

Moreover, with the energy storage device 10 according to the first embodiment, the first layer 124a of the first separator 124 of the two separators 124 and 125, on which the first surface is formed, is bonded to the core 126, and furthermore, the two separators 124 and 125 are bonded together via the first layers 124a and 125a of the two separators 124 and 125, on which the first surfaces having the superior thermal bonding properties are formed. In other words, the first separator 124 can be directly bonded to the core 126, and the second separator 125 can be indirectly bonded to the core 126 via the first separator 124. With this, the two separators 124 and 125 can be securely bonded to the core 126.

Moreover, with the energy storage device 10 according to the first embodiment, the separators 124 and 125 which contain heat resistant particles are used in order to maintain insulation between the positive electrode 122 and the negative electrode 123 in the electrode assembly 120 when the energy storage device 10 is placed in a high temperature environment. When the separator contains heat resistant particles, the layer in which the heat resistant particles are contained generally has extremely poor thermal bonding properties. Even when the separators 124 and 125 have a surface having poor thermal bonding properties, the two separators 124 and 125 can be securely bonded to the core 126.

Moreover, with the energy storage device 10 according to the first embodiment, oxidation of the separators 124 and 125 from high potential can be prevented since the second layers 124b and 125b containing heat resistant particles sandwich the high electrode potential positive electrode 122 in the electrode assembly 120 of the energy storage device 10.

It is to be noted that with the energy storage device 10 according to the first embodiment, the core 126 does not necessarily need to have thermal bonding properties that are greater than the first layers 124a and 125a of the first and second separators 124 and 125, on which the first surfaces having thermal bonding properties superior to those of the second surfaces are formed. Even when the core 126 has thermal bonding properties that are merely greater than those of the second layers 124b and 125b of the first and second separators 124 and 125, on which the second surfaces having thermal bonding properties inferior to those of the first surfaces are formed, the core 126 can be sufficiently bonded to the first layers 124a and/or 125a of at least one of the first and second separators 124 and 125.

Figure 5:
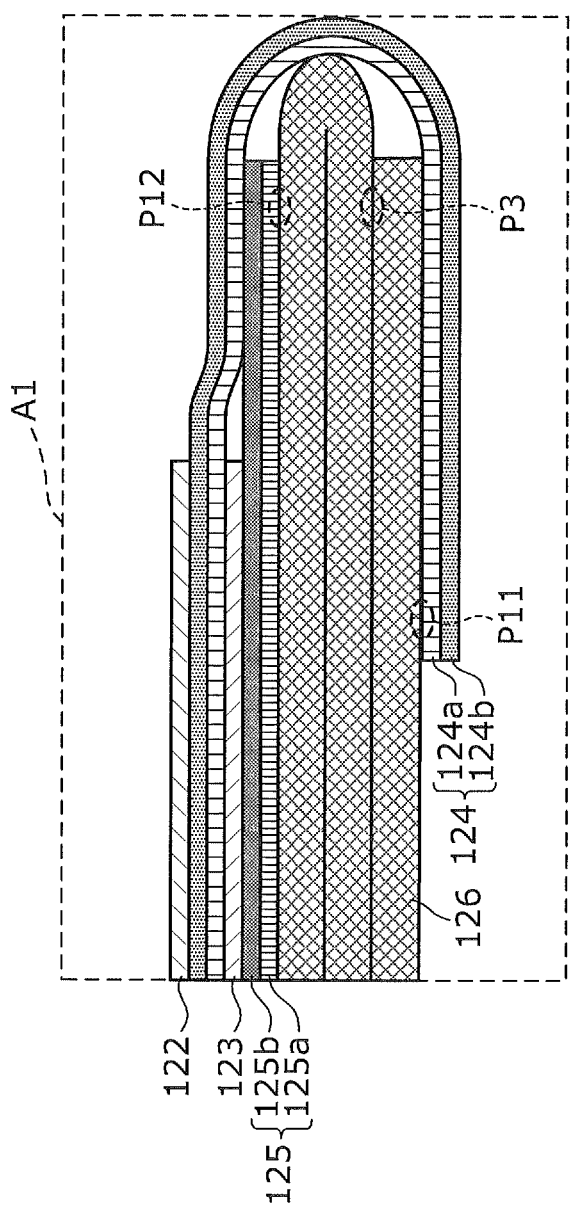
FIG. 5 is an expanded view of the portion A1 shown in FIG. 3 ($a$) of the energy storage device according to a variation of the first embodiment according to the present invention.

It is to be noted that in the energy storage device 10 according to the first embodiment, the first layer 124a of the first separator 124, on which the first surface is formed, is directly bonded to the core 126, and the first layer 125a of the second separator 125, on which the first surface is formed, is bonded to the first separator 124, and thereby indirectly bonded to the core 126, but the energy storage device 10 is not intended to be limited to this configuration. For example, as FIG. 5 shows, the first layer 124a of the first separator 124, on which the first surface is formed, is bonded to the core 126 at the first point P11. The first layer 125a of the second separator 125, on which the first surface is formed, is bonded at a second point P12, which is at a different location on the core 126 than the first point P11. As such, both the first separator 124 and the second separator 125 are directly bonded to the core 126. This sort of configuration is also acceptable.

It is to be noted that in the energy storage device 10 according to the first embodiment, the two separators 124 and 125 sandwich the positive electrode 122, and the second layers 124b and 125b of the two separators 124 and 125, on which the second surfaces are formed, are in contact with the positive electrode 122. Moreover, the two separators 124 and 125 sandwich the negative electrode 123, and the first layer 124a and the first layer 125a of the separators, on which the respective first surfaces are formed, are in contact with the negative electrode 123. However, when the thermal conductivity of the negative electrode is greater than that of the positive electrode, such as when the positive electrode includes $LiMO_2$ and the negative electrode includes a carbon material, a configuration is acceptable in which the two separators 124 and 125 sandwich the positive electrode 122, and the first layer 124a and the first layer 125a of the separators, on which the respective first surfaces are formed, are in contact with the positive electrode 122, and furthermore the two separators 124 and 125 sandwich the negative electrode 123, and the second layer 124b and the second layer 125b of the separators, on which the respective second surfaces are formed, are in contact with the negative electrode 123. In other words, as long as the two separators 124 and 125 sandwich a more thermally conductive one of the positive electrode 122 and the negative electrode 123 and the first surfaces of the two separators 124 and 125 are in contact with the more thermally conductive one of the positive electrode 122 and the negative electrode 123, the following advantages are achievable.

To put it in other words, when the energy storage device 10 is placed in a high temperature environment, the more thermally conductive one of the positive electrode 122 and the negative electrode 123 in the electrode assembly 120 will increase in temperature faster than the other. As a result, the first surfaces of the two separators 124 and 125, which have superior thermal bonding properties, increase in temperature causing the surfaces to melt. This closes up a portion of the holes in the separators 124 and 125. As a result, ionic conduction allowed by the separators 124 and 125 decreases, and discharge of the energy storage device 10 while placed in a high temperature environment can be prevented.

Second Embodiment

Figure 6:
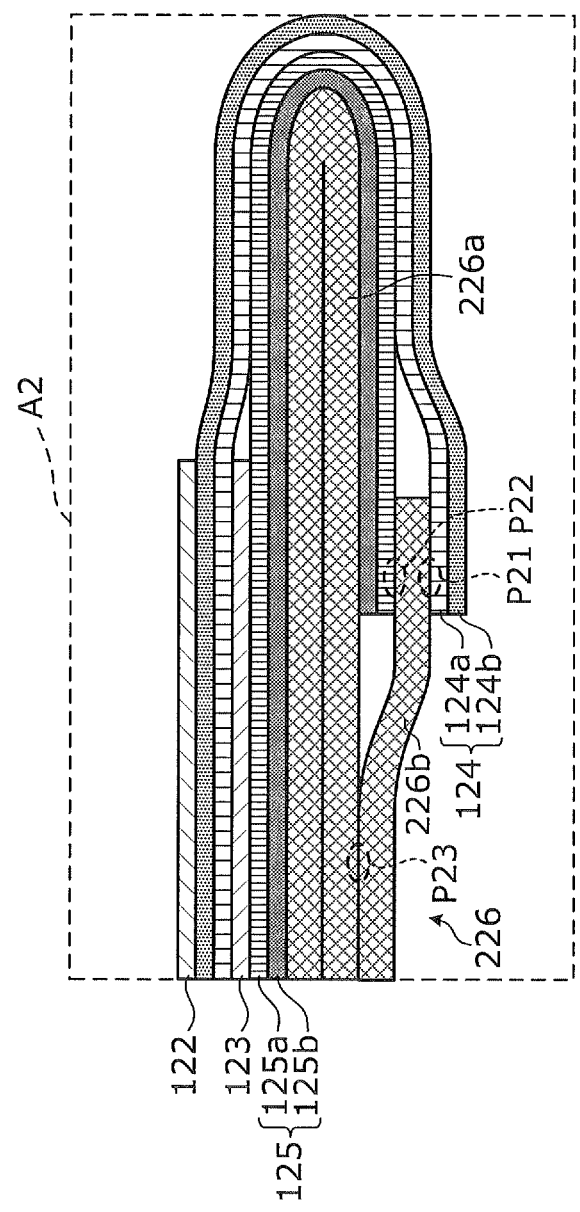
FIG. 6 is an expanded view of the portion A2 shown in FIG. 3 ($a$) of the energy storage device according to the second embodiment of the present invention.

FIG. 6 is an expanded view of the portion A2 shown in FIG. 3 (a) of the energy storage device 20 according to the second embodiment of the present invention. The energy storage device 20 according to the second embodiment is different from the energy storage device 10 according to the first embodiment in that the bonding points of the two separators 124 and 125 and the core 126 are in different positions. Other configurations of the energy storage device 20 are not shown in FIG. 6 but are similar to the energy storage device 10 according to the first embodiment. As such, explanations thereof will be omitted.

With the energy storage device 20 according to the second embodiment, as FIG. 6 shows, the core 126 is a long, belt-shaped sheet folded on itself more than once. A third point, P23, is located on the outermost fold of the folded sheet closer to the end of the innermost fold of the folded sheet than the end of the outermost fold. It is at this third point P23 that two or more of the overlapping folds of the folded sheet are bonded together. Moreover, the core 126 includes a main body 226a of the sheet folded one or more times, and a branch portion 226b formed on the outer fold of the main body 226a extending from the third point P23 where the overlapping folds are bonded together to the end of the outermost fold.

The first layers 124a and 125a of the two separators 124 and 125, on which the first surfaces are formed, are bonded to the branch portion 226b while the two separators 124 and 125 sandwich the branch portion 226b. Specifically, the first separator 124 and the second separator 125 are layered so that the first layer 124a and the first layer 125a, on which the first surfaces are formed, oppose each other, and so that the innermost layer of the separators 124 and 125 sandwich the end of the branch portion 226b of the core 226. In this state, first layer 124a of the first separator 124, on which the first surface is formed, is bonded to the outer surface of the branch portion 226b at a first position P21, and the first layer 125a of the second separator 125, on which the first surface is formed, is bonded to the inner surface of the branch portion 226b at a second position P22. The first separator 124 and the second separator 125 bonded to the outer layer of the core 126 in this way are layered to separate the positive electrode 122 and the negative electrode 123 and are wound together with the positive electrode 122 and the negative electrode 123.

In the energy storage device 20 according to the second embodiment, the two separators 124 and 125 are each bonded to the branch portion 226b of the core 226 via the first layers 124a and 125a thereof, on which the first surfaces having bonding properties that are superior to those of the second surfaces are formed. With this, the two separators 124 and 125 can be securely bonded to the core 126.

It is to be noted that in the energy storage device 20 according to the second embodiment, the two separators 124 and 125 are each bonded to the branch portion 226b of the core 226 via the first layers 124a and 125a thereof, on which the first surfaces having bonding properties that are superior to those of the second surfaces are formed, but the bonding of the two separators 124 and 125 to the branch portion 226b is not intended to be limited to this configuration.

Figure 7:
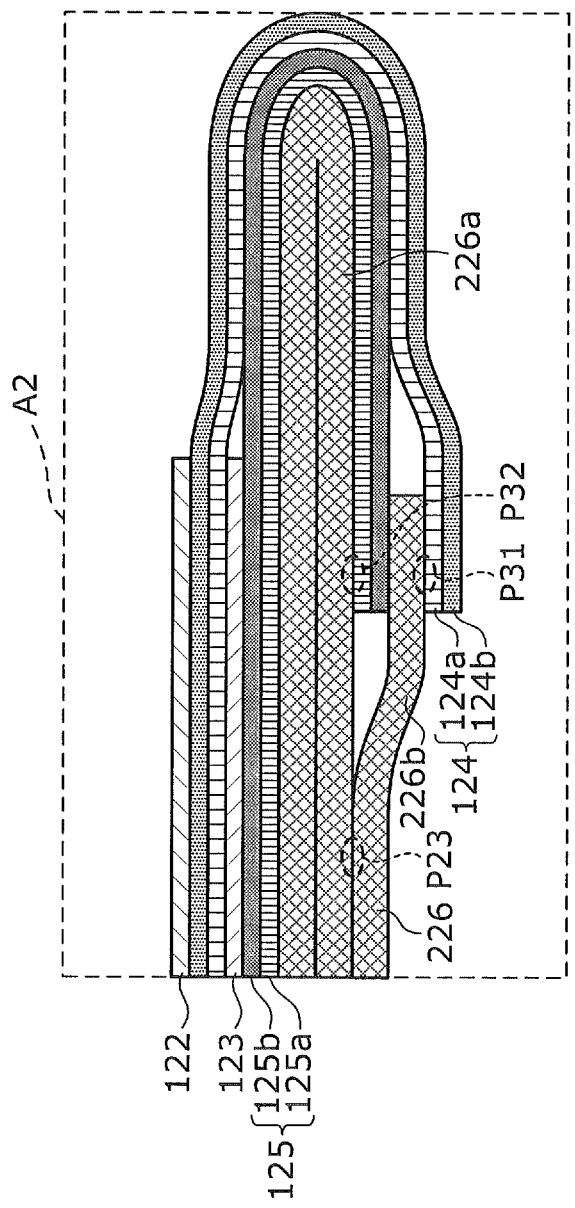
FIG. 7 is an expanded view of the portion A2 shown in FIG. 3 ($a$) of the energy storage device according to a variation of the second embodiment according to the present invention.
Figure 8:
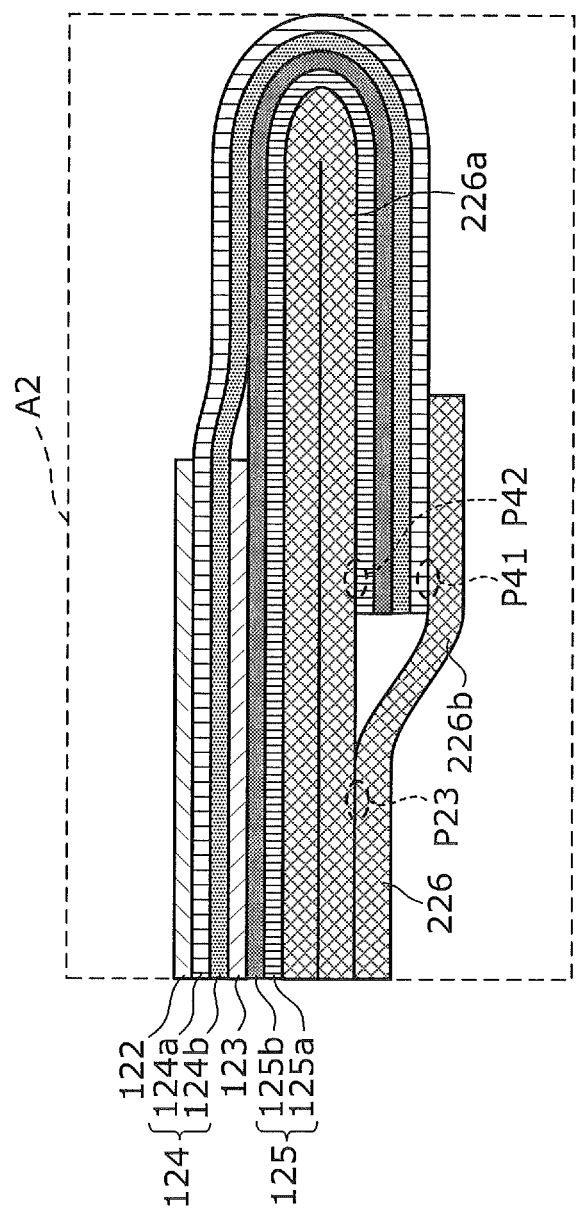
FIG. 8 is an expanded view of the portion A2 shown in FIG. 3 ($a$) of the energy storage device according to a variation of the second embodiment according to the present invention.

For example, the energy storage device 20 may have a configuration such as the one shown in FIG. 7. Here, the first layer 124a of the first separator 124 is bonded to the outer surface of the branch portion 226b at a first position P31, and the first layer 125a of the second separator 125 is bonded to the outer surface of the main body 226a at a second position P32. Moreover, the energy storage device 20 may have a configuration such as the one shown in FIG. 8. Here, the first layer 124a of the first separator 124 is bonded to the inner surface of the branch portion 226b at a first position P41, and the first layer 125a of the second separator 125 is bonded to the outer surface of the main body 226a at a second position P42.

(Variation)

With the winding apparatus 500 according to the above-described first embodiment, the bonding unit 502 bonds the first separator 124 and the core 126 at the first point P1 shown in FIG. 3B, and bonds the two separators 124 and 125 together at the second point P2. However, the bonding unit 502 is not limited to performing both of these bonding processes. That is to say, as long as the bonding unit 502 bonds at least one of the two separators 124 and 125 to the core 126 via the first surface thereof that has the superior thermal bonding properties, the configuration of bonding is not restricted.

INDUSTRIAL APPLICABILITY

The energy storage device according to an aspect of the present invention is applicable as an energy storage device that employs the use of a separator provided with a layer having poor thermal bonding properties, such as a heat resistant coated layer, and that is capable of inhibiting a decrease in performance.

The invention claimed is:

1. An energy storage device comprising:
a core; and
a wound body which is wound around the core, the wound body comprising:
   a positive electrode;
   a negative electrode; and
   first and second separators, the first separator being interposed between the positive electrode and the negative electrode, and each of the first and second separators having a first surface and a second surface, the first surface having thermal bonding properties greater than thermal bonding properties of the second surface,
wherein the first separator comprises:
   a first portion bonded to a first side of the core; and
   a second portion bonded to the second separator on a second side of the core opposite the first side when viewed from an winding axis direction around which the wound body is wound.

2. The energy storage device according to claim 1, wherein the first and second separators are bonded together via the first surfaces thereof.

3. The energy storage device according to claim 1, wherein the two separators are bonded to the core via the first surfaces thereof.

4. The energy storage device according to claim 3, wherein the core has a main body and a branch portion branching off from the main body, and
at least one of the two separators is bonded to the branch portion via the first surface thereof.

5. The energy storage device according to claim 4, wherein the two separators sandwich the branch portion and are bonded to the branch portion via the first surfaces thereof.

6. The energy storage device according to claim 4, wherein one of the two separators is bonded to the branch portion via the first surface thereof, and
the other of the two separators is bonded to the main body via the first surface thereof.

7. The energy storage device according to claim 1, wherein the core includes a material having thermal bonding properties greater than thermal bonding properties of the first surface.

8. The energy storage device according to claim 1, wherein the first and second separators each have a first layer on which the first surface is formed and a second layer on which the second surface is formed, the second surface having thermal bonding properties less than thermal bonding properties of the first surface, and
the second layer contains heat resistant particles.

9. The energy storage device according to claim 8, wherein the first and second separators sandwich the positive electrode, and the second surfaces of the first and second separators are in contact with the positive electrode.

10. The energy storage device according to claim 1, wherein the first and second separators sandwich a more thermally conductive one of the positive electrode and the negative electrode, and the first surfaces of the first and second separators are in contact with the more thermally conductive one of the positive electrode and the negative electrode.

11. The energy storage device of claim 1, wherein the first separator further comprises:
   a third portion which is formed around an end of the core; and
   a fourth portion which is interposed between the positive electrode and the negative electrode on the second side of the core which is opposite the first side.

12. The energy storage device of claim 11, wherein the second surface of the second separator contacts a surface of the second side of the core.

13. The energy storage device of claim 11, wherein the first surface of the second separator contacts a surface of the second side of the core, and is bonded to the surface of the second side of the core.

14. The energy storage device of claim 11, wherein the second portion of the first separator is formed between the third portion and the fourth portion, and
   wherein the second portion of the first separator is bonded to an end of the second separator on the second side of the core.

15. The energy storage device of claim 14, wherein the second separator is formed between an end of the negative electrode and the second side of the core.

16. The energy storage device of claim 1, wherein the first surface comprises a first layer comprising a microporous sheet including a thermoplastic resin, and
   wherein the second surface comprises a second layer including one member selected from the group consisting of inorganic particles and a heat resistant resin.

17. The energy storage device of claim 16, wherein the core comprises a thermoplastic resin, and the first surface of the first separator is bonded to the core by a thermal bond between the thermoplastic resin of the core and the thermoplastic resin of the first layer.

18. The energy storage device according to claim 1, wherein the core comprises an arc-shaped end portion, and
   wherein the second side of the core comprises a straight portion connected to an end of the arc-shaped end portion, and the second surface of the second separator contacts a surface of the straight portion.

19. The energy storage device according to claim 1, wherein the first surface of the first separator is in contact with the first side of the core, and the second surface of the second separator is in contact with the second side of the core.

20. The energy storage device according to claim 1, wherein the second separator comprises an end portion that extends beyond an end of the positive electrode and beyond an end of the negative electrode, the end portion of the second separator being bonded to the second portion of the first separator.

21. The energy storage device according to claim 20, wherein the first separator comprises an end portion that extends beyond the end of the positive electrode, beyond the end of the negative electrode, and beyond an end of the second separator, the end portion of the first separator including the first and second portions of the first separator.

22. A wound body for an energy storage device, the wound body being wrapped around a core and comprising:
   a positive electrode;
   a negative electrode;
   a first separator which:
      is bonded to a first side of the core;
      is interposed between the positive electrode and the negative electrode; and
      includes first and second layers, the first layer having thermal bonding properties greater than thermal bonding properties of the second layer; and
   a second separator which:
      is bonded to the first separator on a second side of the core opposite the first side when viewed from an winding axis direction around which the wound body is wound;
      is interposed between the negative electrode and the core; and
      includes third and fourth layers, the third layer having thermal bonding properties greater than thermal bonding properties of the fourth layer.

* * * * *